United States Patent [19]

Toyama et al.

[11] 4,232,332
[45] Nov. 4, 1980

[54] COLOR TELEVISION RECEIVER

[75] Inventors: Akira Toyama; Akio Ohkoshi, both of Tokyo; Takashi Toyama, Kokubunji; Takahiro Yukawa, Tokyo; Takashi Hosono, Yokohama, all of Japan

[73] Assignee: Sony Corporation, Tokyo, Japan

[21] Appl. No.: 972,236

[22] Filed: Dec. 22, 1978

[30] Foreign Application Priority Data

Dec. 26, 1977 [JP] Japan .................. 52-156915

[51] Int. Cl.³ .............................. H04N 9/24
[52] U.S. Cl. .............................. 358/67
[58] Field of Search ................ 358/67, 69, 70

[56] References Cited
U.S. PATENT DOCUMENTS

| 3,234,324 | 2/1966 | Mutschler | 358/69 |
| 3,748,375 | 7/1973 | Sunstein | 358/69 |
| 3,881,182 | 4/1975 | Archakov et al. | 358/69 |

Primary Examiner—Richard Murray
Attorney, Agent, or Firm—Lewis H. Eslinger; Alvin Sinderbrand

[57] ABSTRACT

A control system for a beam index cathode ray tube momentarily gates or turns off all beam current at the transition from one color modulating signal to another. The resulting dip in the electron beam density, as it scans across an index phosphor stripe located between adjacent color phosphor areas, produces a substantially corresponding dip in the index signal derived from excitation of the index phosphor stripe by the electron beam. The dip in the index signal is detectable as an indication of the phase of the index signal substantially independent of differences in the amplitude of the electron beam current.

17 Claims, 36 Drawing Figures

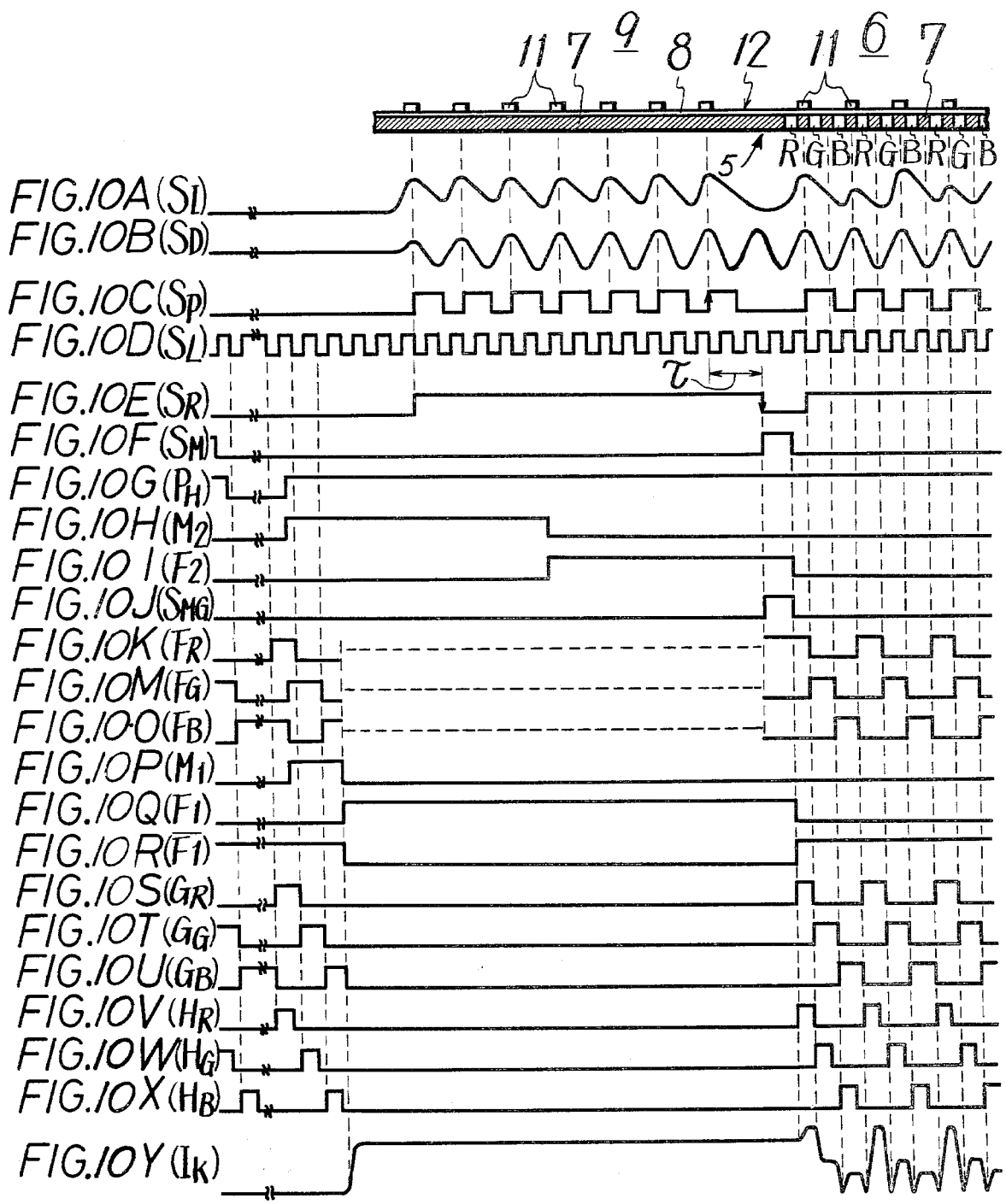

COLOR TELEVISION RECEIVER

BACKGROUND OF THE INVENTION

1. Field of the Invention

The present invention relates generally to a beam index color cathode ray tube, and more particularly to a beam index color cathode ray tube which can reproduce color with high fidelity.

2. Description of the Prior Art

In a prior art beam index color cathode ray tube, a single electron beam scans a target screen which consists of triads of parallel red, green and blue vertical color phosphor stripes sequentially repeating across the screen. The color phosphor stripes are sequentially scanned by a scanning electron beam which crosses the color phosphor stripes horizontally in sequence from one side of the screen to the other. Index phosphor stripes are provided on the inner surface of the screen parallel to and in known relationship to the color phosphor stripes. As the electron beam scans horizontally across the screen, it excites the index phosphor stripes into producing a light signal behind the screen. Such light signal is detected by a photodetector to produce an index signal which has a known relationship to the instantaneous position of the electron beam on the screen.

The index signal is used to control the modulation of the electron beam such that the electron beam is density modulated with the red primary color signal when the beam scans across a red phosphor stripe, with the green primary color signal when the beam scans across a green phosphor stripe and with the blue primary color signal when the beam scans across a blue phosphor stripe, respectively.

FIGS. 1–3 show arrangements of index phosphor stripes on the inner surface of the screen and positioned between the adjacent color phosphor stripes in prior art color cathode ray tubes. In FIG. 1, the pitch $P_I$ of the index phosphor stripes 11 is the same as, or an integral multiple of, the pitch $P_T$ of each triad of red, green and blue color phosphor stripes R, G and B. The positional relationship between the index phosphor stripes 11 and the respective triads of red, green and blue color phosphor stripes R, G and B is fixed and readily determined from the index signal and hence color synchronization should be achievable in a relatively simple manner.

However, since the relative positions of the index phosphor stripes 11 and the red, green and blue phosphor stripes R, G and B is fixed, any phase shift in the index signal produced, for example, by color modulation of the scanning beam, results in faulty color synchronization and degrades color reproduction fidelity. This is especially noticeable in the reproduction of highly saturated color since the high electron beam current for a particular highly saturated color creates an apparent shift in phase of the index signal.

Phase shift due to color modulation of the scanning beam arises due to conditions illustrated in FIGS. 4A–4C. For purposes of description, it is assumed that the electron scanning beam is a point. In FIG. 4A the electron beam current is constant as the beam scans across index stripe 11. The resulting index signal rises steeply as the scanning beam touches stripe 11, remains approximately constant as the scanning beam scans across the stripe and descends sharply as the scanning beam leaves the stripe. As will be explained, the phase of the index signal is used to control the switching of color modulation signals between the red, green and blue colors such that a red color modulating signal controls the electron beam as it crosses a red color phosphor stripe, a green color modulating signal controls the electron beam as it crosses a green color phosphor stripe and the blue color modulation signal controls the electron beam as it crosses a blue color phosphor stripe. If there is an error in detecting the phase of the index signal, the phase of the color control signals can also be shifted such that, for example, when the electron beam scans the green color phosphor stripes, the electron beam density may be affected by the red or blue color signals.

The manner in which phase shifts of the index signal due to color modulation can be detected is shown in FIGS. 4B and 4C. In FIG. 4B, the beam current is assumed to be increasing as the beam scans across the index stripe 11, and the resulting index signal slopes upward to the right. When detecting the phase of the resulting index signal in FIG. 4B, the phase appears to be shifted forward in time, as indicated by the arrow. Similarly, when scanning with a beam which is decreasing in intensity as shown in FIG. 4C, the resulting index signal slopes downward to the right and appears to be retarded in time, as indicated by the arrow.

FIG. 5 shows an example of beam current variation in relation to the scanning of the color phosphor stripes and index stripes of a beam index cathode ray tube. In the illustrated example, the red signal is assumed to have a higher amplitude than the green, which, in turn has higher amplitude than the blue modulating signal. In addition, the modulating signals are shown to make a sharp transition from one to the other as the beam scans midway between color phosphor stripes. Such variation of the beam current as the beam scans the index phosphor stripes 11 produces the index signal shown on FIG. 5 to have a higher amplitude at the left-hand portion corresponding to the beam current for the red color and a lower portion at the right-hand portion corresponding to the beam current for the green color. As indicated by the arrows, this produces an apparent retarding phase shift. Synchronizing circuits responding to this index signal would incorrectly shift the transition point between color leftward and this would result in faulty color synchronization. The faulty color synchronization would, of course, change as the ratio of the red and green color modulating signals was varied.

Because of the phase shift due to color modulation of the scanning beam, a one-to-one relationship between index phosphor stripes 1a and color phosphor stripe triads has been considered undesirable. Therefore, the arrangements in FIGS. 2 and 3 are frequently used. The pitch $P_I$ of the index phospor stripes 11 is selected to be a non-integral multiple of the pitch $P_T$ of the triads of color phosphor stripes. Thus, pitches $P_I$ of $\frac{2}{3}$, 4/3 or generally $(3n\pm 1)/3$ (where n is 0, 1, 2, . . . ) of the pitch $P_T$ of the triads of red, green and blue color phosphor stripes R, G and B may be used. With the foregoing arrangement, the positional relationships between the index phosphor stripes 1a and the triads of red, green and blue color phosphor stripes R, G and B are varied sequentially across the image area so that a phase shift in the index signal due to color modulation does not appear uniformly across the screen and hence the color synchronization is considerably improved.

The variation in positional relationships across the screen between the index phosphor stripes 11 and the triads of red, green and blue color phosphor stripes R,G and B, requires a relatively complex synchronization technique to establish color synchronization.

Even with a non-integral relationship between the triads of color phosphor stripes and the index stripes, although this arrangement improves color synchronization, spurious phase shifts in the index signal due to color modulation of the scanning beam continue to cause color phase errors in color reproduction.

Although the foregoing description was based on the assumption that the electron beam is a point, the same results are obtained with a real electron beam which has finite dimensions.

A further reason for faulty color synchronization is the time delay inherent in practical circuits between detecting an index signal, determining that a phase error exists, generating a correction signal and applying the correction signal to the beam index cathode ray tube. Due to the time delay involved, when the frequency of the index signal drifts, its phase also shifts. Consequently, when the scan speed of the electron beam changes from point to point across the image area, the resulting change in frequency of the index signal produces a phase shift which affects color synchronization which varies across the screen according to speed of the scanning beam.

OBJECTS AND SUMMARY OF THE INVENTION

Accordingly, an object of the present invention is to provide a novel control system for a beam index color cathode ray tube free from the described defects encountered in the prior art.

Another object of the invention is to provide a control system for a beam index color cathode ray tube in which color synchronization can be performed correctly.

Still another object of the invention is to provide a control system for a beam index color cathode ray tube in which color synchronization is free from disturbance by noise.

More specifically, it is an object of the present invention to provide a control system for a beam index color cathode ray tube in which color synchronization is accurately achieved and wherein color phase error due to color modulation of the electron beam is eliminated.

It is a still further object of the invention to provide a beam index cathode ray tube employing the omission of an index stripe from the portion of the run-in area nearest the boundary with the image area to establish color synchronization, so that the starting point of color control signals cannot be shifted forward by noise occurring before the electron beam reaches the image area.

According to an aspect of the invention, there is provided a control system for a beam index cathode ray tube of the type which generates an index signal in response to the position of a scanning electron beam comprising means responsive to the index signal for generating a plurality of sequentially repeating color gating signals, means for providing gaps or spaces between at least some adjacent color gating signals and color gate means responsive to the color gating signals for sequentially gating a corresponding plurality of color modulation signals onto the electron beam, the gaps or spaces being effective to produce dips in the electron beam.

According to another aspect of the invention, a color television receiver is provided with a beam index cathode ray tube which has adjacent sets of color phosphor areas sequentially repeating across an image area on a screen and beam forming means for forming an electron beam scannable across the screen, and an index signal generating means generates an index signal in response to the electron beam scanning across the screen in predetermined positional relationship to the sets of color phosphor areas. A color gating signal generating means is phase controlled by the index signal for generating first, second and third sequentially repeating color gating signals spaced 120 degrees apart with gaps or spaces between at least some adjacent color gating signals. The color gating signals gate first, second and third color signals through respective gate means for modulating the electron beam, and the gaps or spaces between adjacent color gating signals produce dips in the electron beam. The color gating signals are maintained in timed relation to the index signals, preferably by a phase locked loop, and most preferably by a phase locked loop in which the frequency of its output is an integral multiple of the frequency of the index signal.

The above, and other objects, features and advantages of the present invention, will become apparent from the following description read in conjunction with the accompanying drawings in which like reference numerals and letters designate the same elements.

BRIEF DESCRIPTION OF THE DRAWINGS

FIGS. 10A-10Y are waveform diagrams to which reference will be made in explaining the operation of the control system shown in FIG. 8.

DESCRIPTION OF THE PREFERRED EMBODIMENT

Figure 1:
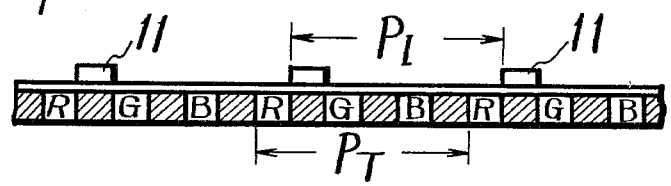
FIGS. 1-3 are fragmentary cross-sectional views of beam index color cathode ray tube screens showing arrangements of index and color phosphor stripes.
Figure 2:
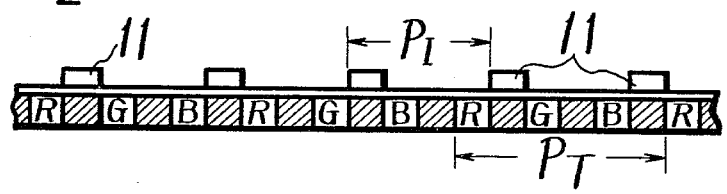
Figure 3:
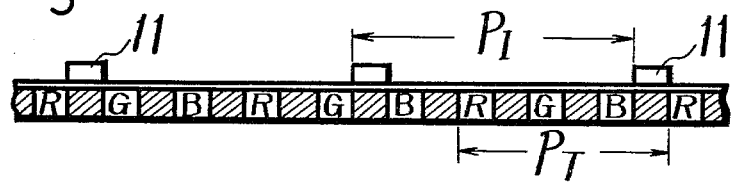
Figure 4A:
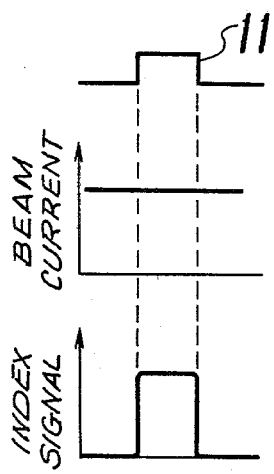
FIGS. 4A-4C are waveforms to which reference will be made in explaining the cause of apparent spurious phase shift in index signals in the prior art.
Figure 4B:
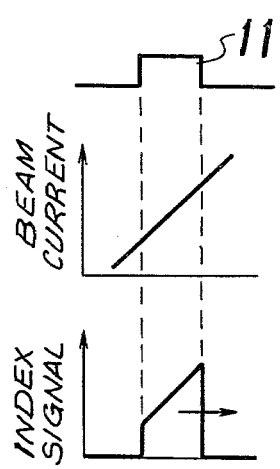
Figure 4C:
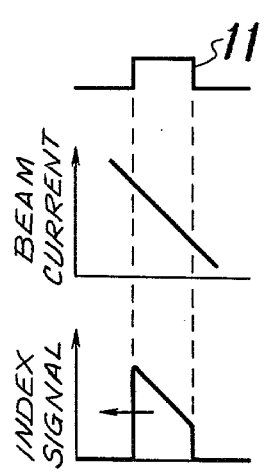
Figure 5:
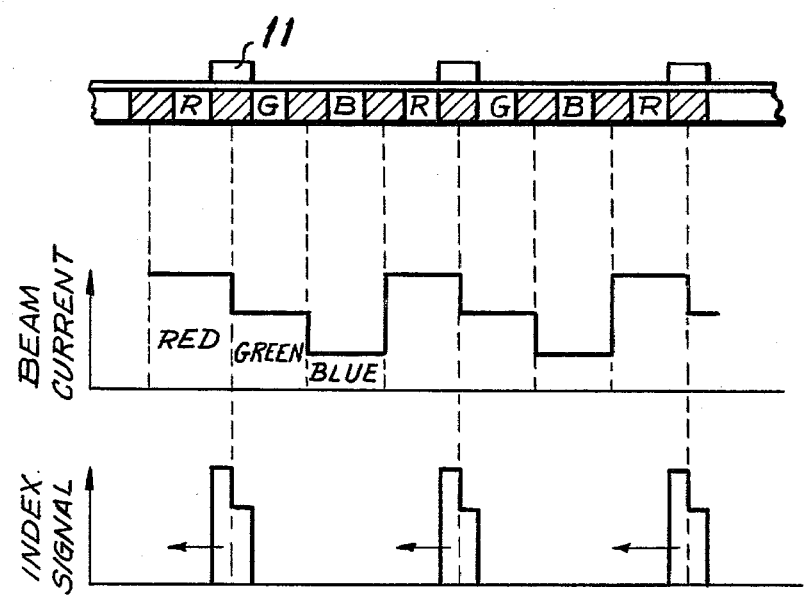
FIG. 5 shows waveform diagrams to which reference will be made in explaining the manner in which color modulation of the scanning beam produces an index signal having an apparent spurious phase shift.

Referring now to FIG. 10A, there is shown across the top thereof a cross sectional view of a portion of the screen 5 of a beam index cathode ray tube suitable for use with the control system of the present invention. The screen 5 of the beam index color cathode ray tube has vertically arranged on its inner surface, triads of parallel red, green and blue color phosphor stripes R, G and B. The triads are repeated in the horizontal scanning direction to define an image area 6. A black layer 7 is coated on the inner surface of the screen 5 between the adjacent color phosphor stripes R, G and B and on the entire marginal run-in area 9 outside the image area 6. The black layer 7 may be of any suitable material but is preferably of carbon or the like. A metallic back layer 8 for example, of aluminum, is thinly coated over the entire rear surface of the screen 5 including the color phosphor stripes R, G, B, and black material layer 7. The metallic back layer 8 is substantially transparent to electrons but is an effective light reflector. Thus, the electron beam penetrates back layer 8 to excite the color phosphor stripes, but most of the light emitted is reflected forward to the viewer rather than being directed into the cathode ray tube.

Index phosphor stripes 11 are formed on the metal back layer 8 at locations spaced apart across the image area 6 and the beam scanning run-in or marginal area 9 at one side of the image area. The index phosphor stripes 11 in the image area 6 are located in spaces between adjacent color phosphor stripes. The pitch of the index phosphor stripes 11 in the beam scanning run-in marginal area 9 and in the image area 6 is shown to be equal to $\frac{2}{3}$ of the pitch of the triads of color phosphor stripes R, G, B. Although a pitch of $\frac{2}{3}$ is shown and is preferred, in general, any pitch having the the relationship of $(3n\pm1)/3$ to the pitch of the triads of color phosphor stripes R, G and B may be used. If desired, even integral arrangement shown in FIG. 1 may be used.

As one method of initially achieving color synchronization, the index phosphor stripes 11 on the run-in area 9 may be employed to prepare the tube and the control circuit for scanning the image area 6 and the index phosphor stripe in the location 12 nearest the image area 6 may be omitted. The omission of the index phosphor stripe in the location 12 is sensed in the control circuit and establishes color synchronization in preparation for scanning the image area 6, as will be explained.

Figure 8:
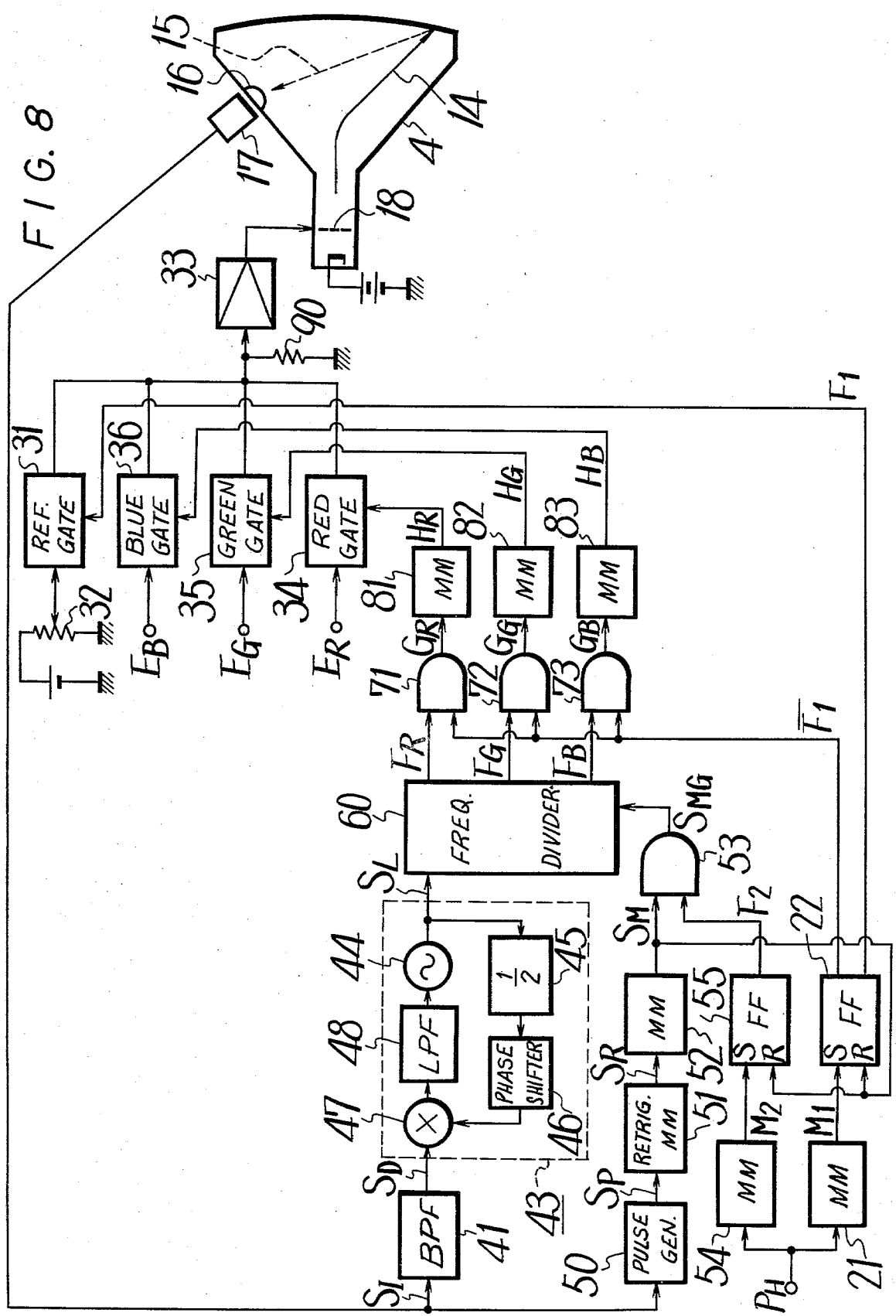
FIG. 8 is a block diagram showing an embodiment of the control system for a beam index color cathode ray tube according to the present invention.

Turning now to FIG. 8, a beam index color cathode ray tube 4 having the arrangement of index stripes 11 shown above FIG. 10A is shown further to have a lens 16 on the inner surface of its funnel portion. The lens 16 receives light radiation represented by dashed line 15 which is emitted by the index phosphor stripes (not shown in FIG. 8) as an electron beam 14 scans over them. Outside the funnel portion a photodetector 17 is disposed in a location where it can receive the light radiation 15 collected by the lens 16.

In the example of FIG. 8, a horizontal line synchronizing signal $P_H$ (FIG. 10G) is fed to a monostable multivibrator 21 which then produces a positive-going pulse $M_1$ (FIG. 10P) having a constant pulse width. The pulse $M_1$ is fed to the set input S of a flip-flop circuit 22 which is then set by the negative-going trailing edge of pulse $M_1$ and produces a set output $F_1$ of "1" (FIG. 10Q) and a reset output $\overline{F}_1$ of "0" (FIG. 10R). The set output $F_1$ enables or makes conductive a reference gate circuit 31 which is supplied with a DC voltage, whose value is previously adjusted by a variable resistor 32. The DC voltage is applied through enabled reference gate circuit 31 and an amplifier 33 to a first grid 18 of the cathode ray tube 4, so that the electron beam 14 is thereby controlled to have a constant value of intensity as it scans the index phosphor stripes 11 on the beam scanning run-in area. The constant electron beam 14 causes photodetector 17 to produce index signal $S_I$ (FIG. 10A).

The index signal $S_I$ is fed to a band pass filter 41 to produce a generally sinusoidal reference signal $S_D$ (FIG. 10B) with a fundamental frequency equal to the frequency of the index signal $S_I$. Reference signal $S_D$ is fed to a phase locked loop circuit 43 which then produces a pulse signal $S_L$ synchronized with the reference signal $S_D$, as shown on FIG. 10D. The phase locked loop circuit 43 includes a voltage controlled oscillator 44, providing oscillation pulses which are frequency divided by two in a frequency divider 45. The frequency divided pulses are fed to a phase shifter 46 for phase adjustment. The phase-adjusted pulses are fed to a phase comparator 47 to be phase-compared with the signal $S_D$ applied thereto from the band pass filter 41. The compared error voltage from phase comparator 47 is applied through a low pass filter 48 as the control voltage for voltage controlled oscillator 44 which thus produces the pulses $S_L$ phase locked to twice the frequency of reference signal $S_D$. The pulses $S_L$ are fed to a frequency divider 60 to be divided by three and phase shifted to produce three color gating pulse outputs $F_R$, $F_G$ and $F_B$ which are 120 degrees apart.

Monostable multivibrator 54 is triggered by the positive going trailing edge of the line synchronizing signal $P_H$ (FIG. 10G) into producing a signal $M_2$ (FIG. 10H) of fixed duration. The duration of the signal $M_2$ is selected to be long enough so that the electron beam will have completed a portion of its scan across index phosphor stripes 11 in the run-in area 9. At the negative going trailing edge of the signal $M_2$, a flip-flop circuit 55 is triggered into the set condition. Flip-flop circuit 55 provides a "1" on its set output $F_2$ to enable one input of AND gate 53.

The index signal $S_I$ from the photodetector 17 is also applied to a pulse generating circuit 50 from which index pulses $S_P$ (FIG. 10C) are obtained. Index pulses $S_P$ are fed to the input of a retriggerable monostable multivibrator 51.

Retriggerable monostable multivibrator 51 has a timing period $\tau$ slightly exceeding the period of the index pulses $S_P$. When retriggerable multivibrator 51 is retriggered again before the completion of its timing period $\tau$, its output remains unchanged until an index pulse fails to arrive in time. This is shown in FIG. 10E where the signal $S_R$ goes high upon the first positive-going leading edge of the index pulses $S_P$ and remains in that condition throughout a plurality of index pulses $S_P$ until after the positive-going leading edge of index pulse $S_P$ indicated by the upward pointing arrow in FIG. 10C. The omission of an index stripe in location 12 permits the timing period $\tau$ to end and produce the negative-going transition in the signal $S_R$ indicated by the downward pointing arrow in FIG. 10E.

The signal $S_R$ is fed to monostable multivibrator 52 which then produces a trigger pulse $S_M$ (FIG. 10F) at the positive-going trailing edge of the signal $S_R$ represented by a downward pointing arrow on FIG. 10E. The pulse $S_M$ has a width suitable to match the timing.

The trigger pulse $S_M$ is fed to one input of an AND gate 53 and to the reset inputs R of flip-flop circuits 22 and 55 which are then reset at the trailing edge of the pulse $S_M$. The gated trigger signal $S_{MG}$ (FIG. 10J) from AND gate 53 is applied to one input of a frequency divider 60. Thus, the set outputs $F_1$ and $F_2$ from flip-flop circuits 22 and 55 become "0" and the reset output signal $\overline{F}_1$ (FIG. 10O) becomes "1". When the output $F_1$ becomes "0", reference gate circuit 31 is inhibited. In addition, output $\overline{F}_1$, becoming "1" at this time, enables one input of each of AND gates 71–73. In addition, the "0" connected to one input of AND gate 53 from the set output $F_2$ of flip-flop circuit 55 avoids any possibility that the momentary loss of index signals $S_I$ in the image area can produce spurious trigger signals $S_{MG}$ and upset color synchronization.

The pulse $S_{MG}$ synchronizes the frequency divider 60 which, as previously indicated, frequency divides the counting signal $S_L$ from phase locked loop 43 by ⅓ and produces the red, green and blue color gating pulses $F_R$, $F_G$ and $F_B$ differing in phase by 120°, beginning with the color gating pulse required for the first required color just inside the image area 6 (red in the example).

Figure 9:
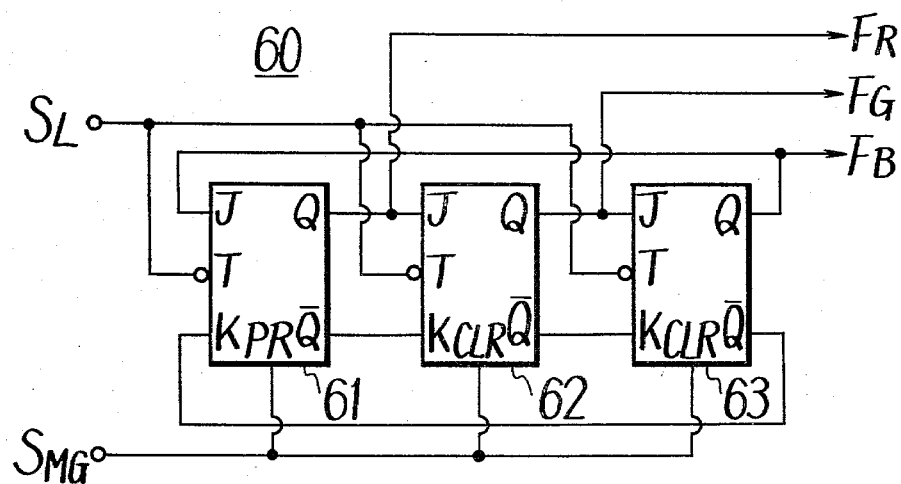
FIG. 9 is a detailed block diagram showing a frequency divider employed in the embodiment of the invention shown in FIG. 8.

An example of a circuit that may constitute frequency divider 60 is described with reference to FIG. 9, where frequency divider 60 is in the form of a ring counter consisting of three stages of JK flip-flop circuits 61, 62 and 63 with the set Q and reset $\overline{Q}$ outputs of each flip-flop circuit connected to J and K inputs respectively of the following flip-flop circuit. The set Q and reset $\overline{Q}$ outputs of JK flip-flop circuit 63 are fed back to the J and K inputs, respectively, of flip-flop circuit 61. The double frequency signal $S_L$ is applied in parallel to the toggle inputs of all of flip-flop circuits 61 to 63. As is well known in the art, upon the occurrence of a negative going trailing edge of a signal at the toggle input of a JK flip-flop circuit, the JK flip-flop circuit assumes the set condition if a "1" exists only at its J input, a reset condition if a "1" exists only at its K input and is not affect if "0" exists at both its J and K inputs.

The gated trigger pulse $S_{MG}$ is fed to the flip-flop circuits 61 to 63 to preset them to a value which will begin the scanning of the color phosphor stripes with the correct color signal. Thus, the flip-flop circuit 61 is set by the gated trigger pulse $S_{MG}$ and the flip-flop circuits 62 and 63 are reset by the pulse $S_{MG}$ as indicated on FIGS. 10K, 10M and 10O. The Q-outputs $F_R$, $F_G$ and $F_B$ from flip-flop circuits 61, 62 and 63, respectively, which are used to gate the three colors, that is, red, green and blue respectively, are preset to $F_R = 1$ and $F_G = F_B = 0$. The frequency divider 60 is preset at the end of the run-in area to first gate the red color until the first red color phosphor stripe R is scanned.

After the scanning beam scans the first red color phosphor stripe in image area 6, the counting pulse $S_L$ at the toggle inputs T of the JK flip-flop circuits find the J input of flip-flop circuit 62 and the K input of flip-flop circuits 61 and 63 enabled. Consequently, at the negative going edge of the signal $S_L$ following the presetting operation, flip-flop circuit 61 is reset and flip-flop circuit 62 is set. No change takes place in flip-flop circuit 63 since both its inputs were "0" at the occurrence of the signal $S_L$. Thus, the Q-output $F_R$ of flip-flop circuit 61 becomes "0", the Q-output $F_G$ of flip-flop circuit 62 becomes "1" and the Q output $F_B$ of flip-flop circuit 63 remains "0". At the next negative-going edge of signal $S_L$, the Q-output $F_G$ becomes "0" and the Q-output $F_B$ becomes "1". To complete the sequence, at the next negative going edge of signal $S_L$, the Q-outputs of the flip-flop circuits 61 to 63 return to their preset conditions. Thereafter, the above sequence is repeated across the image area 6.

Accordingly, the Q-outputs, $F_R$, $F_G$ and $F_B$ of the JK flip-flop circuits 61 to 63 becomes sequentially "1" at the proper times while the electron beam 14 scans the red, green and blue color phosphor stripes R, G and B of the image area 6.

Referring again to FIG. 8, the Q-output pulse signals $F_R$, $F_G$ and $F_B$ from the frequency divider 60 are shown to be applied to the second inputs of AND gates 71, 72 and 73, respectively. Flip-flop circuits 22 and 25 are reset by the trailing edge of pulse $S_M$ from monostable multivibrator 52 and the reset output $\overline{F}_1$ (FIG. 10R) becomes "1" for enabling one input of each of AND gates 71 to 73. The gating pulses $F_R$, $F_G$ and $F_B$ are thus passed through the AND gates 71 to 73 as color gate signals $G_R$, $G_G$ and $G_B$ (FIGS. 10S, 10T and 10U) and are applied respectively to monostable multivibrators 81, 82 and 83 while the electron beam 14 scans the image area 6. Monostable multivibrators 81 to 83 are triggered by the leading edges of their respective color gate signals $G_R$, $G_G$ and $G_B$ into generating respective gating signals $H_R$, $H_G$ and $H_B$ (FIGS. 10V, 10W and 10X) which are slightly narrower than the color gate signals. Since the gating signals $H_R$, $H_G$ and $H_B$ are slightly narrower than their corresponding color gate signals $G_R$, $G_G$ and $G_B$ there exists a short space or gap following the trailing edge of each gating signal $H_R$, $H_G$ and $H_B$ when the outputs of monostable multivibrators 81, 82 and 83 are all "0".

Gating signals $H_R$, $H_G$ and $H_B$ sequentially enable color gate circuits 34, 35 and 36, respectively when the respective gating signals are "1". Thus, red, green and blue primary color signals $E_R$, $E_G$ and $E_B$ are sequentially passed through the gate circuits 34 to 36 and fed through amplifier 33 to the first grid 18 of the color cathode ray tube 4 in step with the electron beam crossing corresponding color stripes. A resistor 90, connected from the input of amplifier 33 to ground, ensures that, in the absence of color modulating signal, the signal applied to first grid 18 is zero.

AND gate 53 is inhibited by the "0" on the set output $F_2$ of flip-flop circuit and prevents the generation of further gated trigger pulses $S_{MG}$ until the next scan begins.

Figure 6:
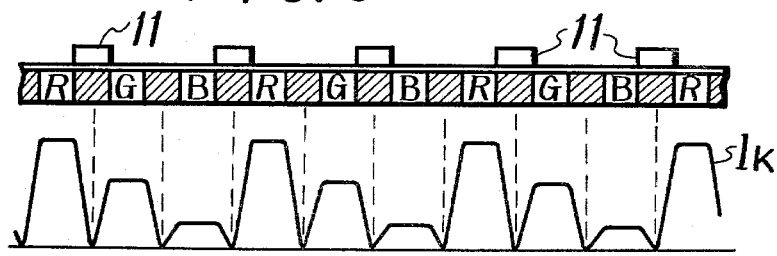
FIG. 6 is a cross-sectional view similar to FIG. 5, but showing the modified waveform generated by a control system according to the present invention.

It will be appreciated that, during each scan across image area 6, the electron beam 14 is density-modulated by a current $I_K$ (FIG. 10Y) having an amplitude corresponding to the red primary color signal $E_R$ when the beam 14 scans a red phosphor stripe R, the green primary color signal $E_G$ when the beam 14 scans a green phosphor stripe G, and the blue primary color signal $E_B$ when the beam 14 scans a blue phosphor stripe B to achieve color synchronization. It will be noted in FIG. 10Y that current $I_K$ has dips in it caused by the short period following the trailing edge of each gating signal $H_R$, $H_G$ and $H_B$ when the outputs of all monostable multivibrators 81, 82 and 83 are "0". The dips in the current $I_K$ are also shown in a large scale in FIG. 6.

Figure 7A:
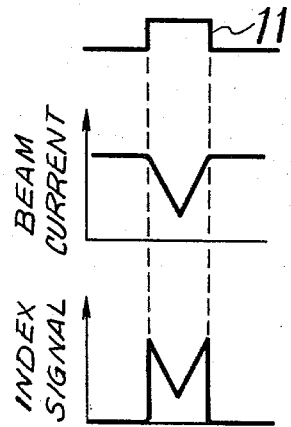
FIGS. 7A-7C are waveform diagrams to which reference will be made in explaining the operation of the embodiment of the invention shown in FIG. 8.
Figure 7B:
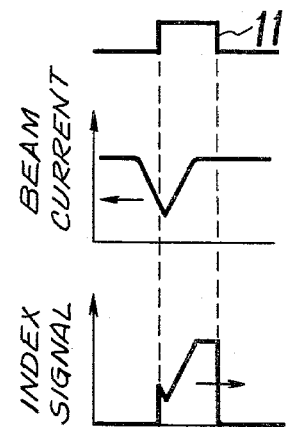
Figure 7C:
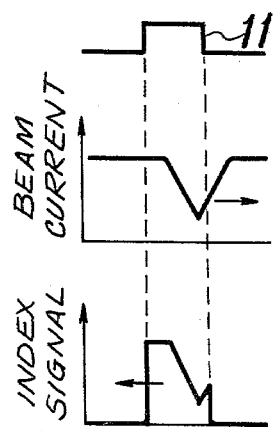

Referring now to FIG. 7A, and again assuming a beam which comes to a point, as the beam scans across an index phosphor stripe 11, if the transition from one color to another accurately occurs at the center of the index stripe 11, the dip in the index signal, corresponding to the dip in the beam current, occurs in the center of the index signal. This is accepted by the phase locked loop 43 (FIG. 8) as an indication that the phases of the gating signals $H_R$, $H_G$ and $H_B$ are correct and, consequently, no correction is attempted. If the dip in the beam current occurs slightly before the beam arrives on the index phosphor stripe, as shown in FIG. 7B, the resulting index signal appears to slope upward to the right and produces an apparent lagging phase error which would cause the phase locked loop 43 to readjust the phase of the gating of the beam current in the direction shown by the arrow to align the dips in the beam current substantially with the centers of the index phosphor stripes 11. Conversely, when the center of the dip occurs past the center of the index stripe 11, the index signal is given a characteristic which induces the phase locked loop 43 to retard the phase of the dip in the beam current to again obtain color synchronization.

From the preceding it would be clear to one skilled in the art that dips in beam current are required for color synchronization purposes only in the locations where index phosphor stripes are located. However, it is convenient in the present embodiment to place a dip between all adjacent color phosphor stripes. Although not required for color synchronization, the placement of dips even between color phosphor stripes which do not have an index phosphor stripe between them may reduce the contamination of one color by its neighboring color.

Although the specific embodiment of the control circuit chosen for description and shown in FIG. 8 employs the omission of an index phosphor stripe immediately before the scanning beam crosses into the image area 6 to initially establish color synchronization, other means of initially establishing color synchronization are equally applicable to the invention. For example, the number of index phosphor stripes 11 in the run-in area 9 may be counted and, upon attaining a predetermined count, the frequency divider 60 may be reset in preparation for the scanning beam entering the image area 6. Alternatively, an index stripe may be omitted in the run-in area several stripes outward from the image area 6 and the omitted stripe may be employed to initialize a counter which thereupon counts the predetermined number of stripes and upon completing the count provides an output which is used to initialize frequency divider 60.

It should be clear to one skilled in the art that a similar result could be achieved by adding an extra index phosphor stripe 11 (not shown) in a selected location rather than omitting one in order to provide a signal which can be employed to initialize the frequency divider for color synchronization.

It should also be clear to one skilled in the art that the use of phosphor stripes for index stripes may be supplanted by other types of index stripes without departing from the scope of the invention. For example, index stripes which change their conductivity, capacitance or other detectable characteristics upon being scanned by an electron beam could be substituted for the index phosphor stripes in the illustrative embodiment.

Having described specific illustrative embodiments of the invention with reference to the accompanying drawings, it is to be understood that the invention is not limited to those precise embodiments, and that various changes and modifications may be effected therein by one skilled in the art without departing from the spirit or scope of the invention as defined in the appended claims.

What is claimed is:

1. A control system for a beam index cathode ray tube of the type which generates an index signal in response to the position of a scanning electron beam comprising: means responsive to said index signal for generating a plurality of sequentially repeating color gating signals, means for providing gaps between at least some adjacent ones of said color gating signals, color gate means responsive to said color gating signals for sequentially gating a corresponding plurality of color signals for modulating the intensity of said electron beam, said gaps being effective to produce corresponding dips in said index signal, and means for detecting a phase of said dips with respect to said index signal and for controlling said color gating signals in response to said phase.

2. The control system according to claim 1, wherein said plurality is three.

3. The control system according to claim 1, wherein said at least some adjacent color gating signals include substantially all adjacent color gating signals.

4. A color television receiver comprising: a beam index cathode ray tube having a screen, adjacent sets of color phosphor areas sequentially repeating across an image area on said screen, beam forming means for forming an electron beam scannable on said screen, index signal generating means located between adjacent pairs of said color phosphor areas for generating an index signal in response to said electron beam scanning on said screen, color gating signal generating means phase controlled by said index signal for generating first, second and third sequentially repeating color gating signals spaced 120 degrees apart, means for providing gaps between at least some adjacent ones of said color gating signals, and color gate means responsive to said color gating signals for gating first, second and third color modulation signals onto said electron beam so as to modulate the intensity of the latter, said gaps producing corresponding dips in said index signal whereby phase control of said color gating signal generating means by said index signal is substantially independent of the intensity of said electron beam when scanning said pairs of color phosphor areas between which said index signal generating means are located.

5. The color television receiver according to claim 4, wherein said means for providing gaps includes first, second and third monostable multivibrators triggered 120 degrees apart and having pulse outputs of less than one-third of a cycle of said sequentially repeating color gating signals.

6. The color television receiver according to claim 4, wherein said color phosphor areas are color phosphor stripes.

7. The color television receiver according to claim 4, wherein said color gating signal generating means includes a phase locked loop responsive to said index signal for generating a counting signal having a frequency equal to a multiple of the frequency of said index signal, a frequency divider operative in response to said counting signal for generating repeating first, second and third contiguous color gate signals, and first, second and third monostable multivibrators triggered by said first, second and third color gate signals, respectively, into generating said first, second and third color gating signals, said first, second and third color gating signals being shorter than said first, second and third color gate signals whereby said gaps are produced.

8. The color television receiver according to claim 4, further comprising gating means enabled by a television synchronizing signal for presetting said color gating signal generating means prior to scanning by said electron beam of a first of said color phosphor areas in said image area whereby color synchronization is achieved.

9. The color television receiver according to claim 8, wherein said screen further has a run-in area contiguous with an edge of said image area, said index signal generating means includes index stripes in said run-in area and in said image area, the index stripes in said run-in area having a characteristic detectable by said gating means to preset said color gating signal generating means.

10. The color television receiver according to claim 9, wherein said characteristic is a change in spacing of said index stripes.

11. The color television receiver according to claim 9, wherein said index stripes are phosphor stripes.

12. In a color television receiver of the type having a beam index color cathode ray tube which contains a screen with an image area having sequentially repeating color phosphor areas thereon, index stripe means located between adjacent pairs of color phosphor areas for generating an index signal as an electron beam is scanned across said screen, a control system for the beam index color cathode ray tube which contains means responsive to said index signal for generating sequentially repeating first, second and third color gating signals, color gate means responsive to said first, second and third color gating signals for sequentially applying first, second and third color modulating signals to said electron beam for modulating the intensity of the latter; the improvement comprising: means for providing gaps between at least some of said color gating signals whereby corresponding dips are created in the intensity of said electron beam substantially in correspondence at least to its scanning over said index stripe means whereby corresponding dips in said index signal are produced.

13. The color television receiver according to claim 12, wherein said means for providing gaps includes at least one monostable multivibrator having an output pulse with a period shorter than one third of a cycle of said first, second and third color gating signals.

14. A method of controlling a beam index color cathode ray tube comprising scanning an electron beam across an image area of said cathode ray tube, generating an index signal responsive to the passage of said electron beam over index stripes in said image area, sequentially gating first, second and third color modulating signals onto said electron beam for modulating the intensity of the latter, phase locking the sequential gating to the index signal, producing dips in the intensity of said electron beam in correspondence to the passage thereof over said index stripes whereby corresponding dips are produced in said index signal, and accuracy of said sequential gating is improved.

15. A color television receiver comprising: a beam index cathode ray tube having a screen including an image area, adjacent sets of color phosphor areas sequentially repeating across said image area of the screen, beam forming means for forming an electron beam scannable on said screen, index signal generating means for generating an index signal in response to said electron beam scanning on said screen in predetermined positional relationship to said sets of color phoshpor areas, color gating signal generating means phase controlled by said index signal for generating first, second and third sequentially repeating color gating signals spaced 120 degrees apart, means for providing gaps between at least some adjacent ones of said color gating signals, and color gate means responsive to said color gating signals for gating first, second and third color modulation signals onto said electron beam so as to modulate the intensity of the latter, said gaps producing corresponding dips in said intensity of the electron beam, said screen further including a run-in area contiguous with an edge of said image area, said index signal generating means including index stripes in said run-in area and in said image area with an omission of an index stripe in said run-in area nearest said image area producing a characteristic detectable by said gating means to preset said color gating signal generating means.

16. A color television receiver comprising: a beam index cathode ray tube having a screen including an image area and a run-in area contiguous with an edge of said image area, adjacent sets of color phosphor areas sequentially repeating across an image area on said screen, beam forming means for forming an electron beam scannable on said screen, index signal generating means for generating an index signal in response to said electron beam scanning on said screen in predetermined positional relationship to said sets of color phosphor areas, color gating signal generating means phase controlled by said index signal for generating first, second and third sequentially repeating color gating signals spaced 120 degrees apart, means for providing gaps between at least some adjacent ones of said color gating signals, color gate means responsive to said color gating signals for gating first, second and third color modulation signals onto said electrom beam so as to modulate the intensity of the latter, said gaps producing corresponding dips in said intensity of the electron beam, said index signal generating means including index stripes in said run-in area and in said image area, said index stripes in said run-in area having a normal spacing between adjacent ones thereof, and at least one adjacent pair of index stripes in said run-in area having a wide spacing therebetween exceeding said normal spacing, said gating means including a retriggerable multivibrator having a period exceeding a normal period of said index signal and being permitted to complete its cycle when the electron beam scans over said wide spacing, and means responsive to the completion of a cycle of said retriggerable multivibrator for presetting said color gating signal generating means.

17. The color television receiver according to claim 16, wherein said wide spacing abuts said image area.

* * * * *